F. A. BARRETT, Jr.
SWITCH.
APPLICATION FILED AUG. 8, 1919.

1,350,916.

Patented Aug. 24, 1920.
2 SHEETS—SHEET 1.

WITNESS:

INVENTOR.
BY F. A. Barrett, Jr.
Victor J. Evans
ATTORNEY.

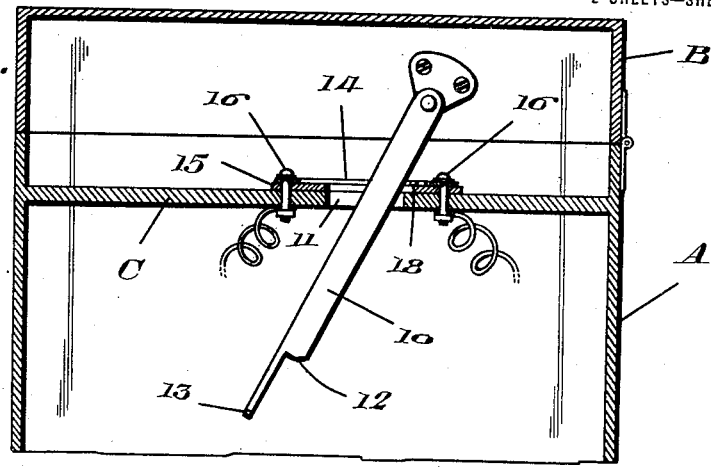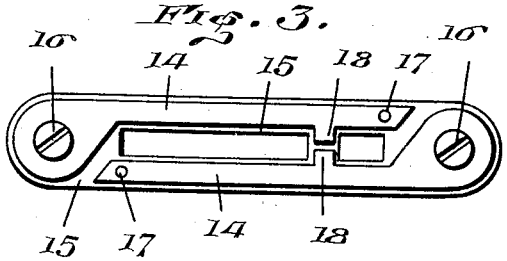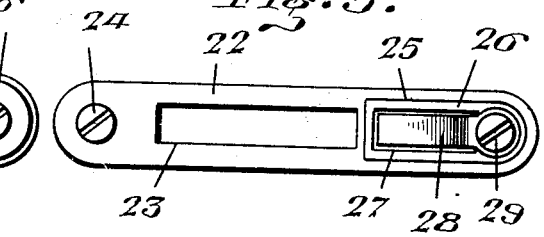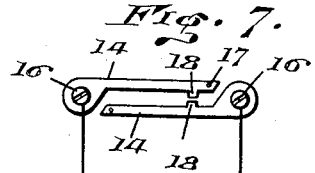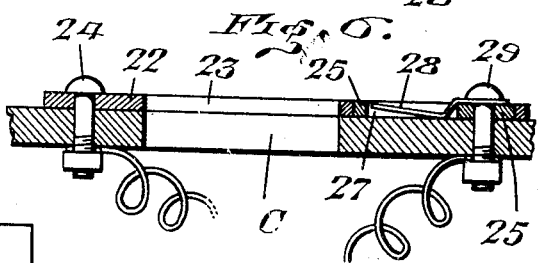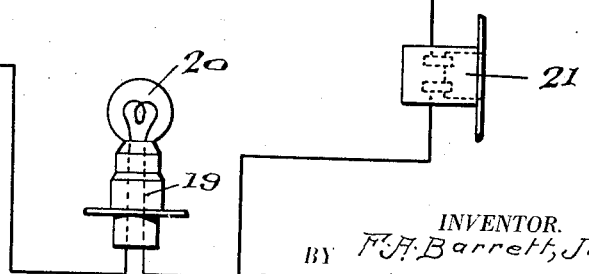

UNITED STATES PATENT OFFICE.

FERDINAND A. BARRETT, JR., OF NIAGARA FALLS, NEW YORK.

SWITCH.

1,350,916.  Specification of Letters Patent.  Patented Aug. 24, 1920.

Application filed August 8, 1919. Serial No. 316,128.

*To all whom it may concern:*

Be it known that I, FERDINAND A. BARRETT, Jr., a citizen of United States, residing at Niagara Falls, in the county of Niagara and State of New York, have invented new and useful Improvements in Switches, of which the following is a specification.

This invention relates to talking machines of that type in which the cabinet is provided with a hinged cover, and has for its object the provision of a switch whereby upon opening the hinged cover an electric light will be automatically energized for enabling the operator to see the interior of the cabinet so that the record and the sound box and associated parts will be clearly visible.

An important object is the provision of a device of this character in which the switch mechanism is formed as a part of the automatic stop for retaining the cover in open position when opened.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings, in which—

Figure 1:
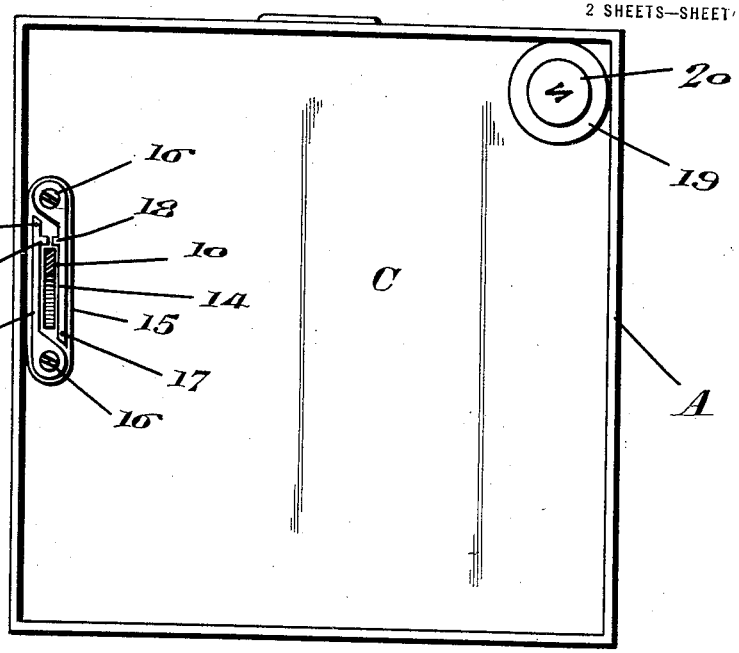
Figure 2:
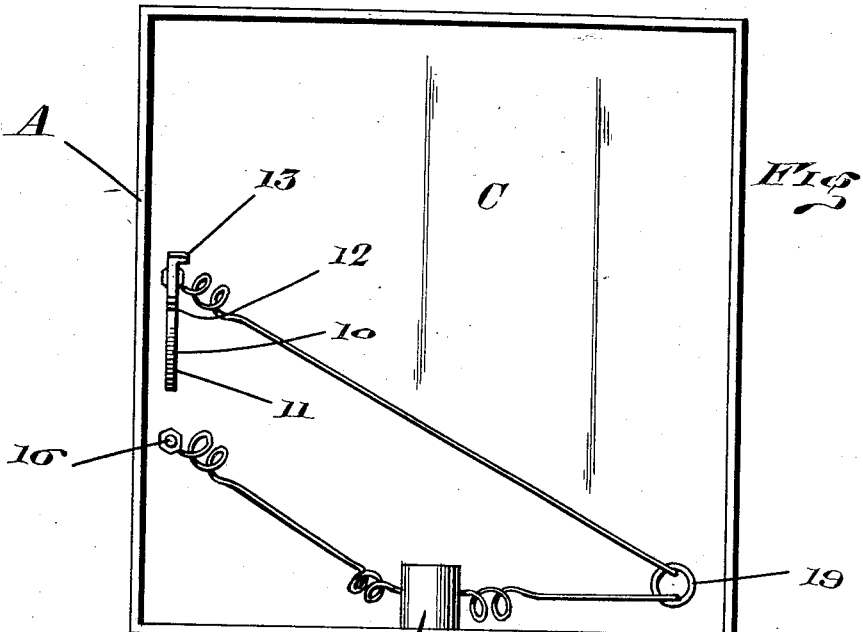

Figure 1 is a plan view showing a talking machine cabinet, the cover being removed and the cover retaining arm being shown in section, Fig. 2 is a bottom plan view of the top of the cabinet disposed beneath the record supporting turntable and showing the wire connections, Fig. 3 is an enlarged plan view of the switch, showing one form thereof, Fig. 4 is a vertical sectional view through the cabinet and cover, taken through the switch, Fig. 5 is an enlarged plan view showing a modified form of the switch, Fig. 6 is a longitudinal sectional view therethrough, and Fig. 7 is a diagram of the electric circuit.

Referring more particularly to the drawings, the letter A designates a talking machine cabinet of any ordinary type having the hinged cover B, and C designates the top plate of the cabinet upon which the turn-table is mounted.

In carrying out my invention I provide a cover retaining arm 10 which is pivoted upon the cover B and which has its other end adapted to extend through a slot 11 in the plate C. This second mentioned or lower end of the arm 10 is cut away to provide a heel 12 and has its toe laterally deflected, as shown at 13, whereby to engage against the underside of the plate C for preventing withdrawal of the arm 10 from the slot 11. It is well known that talking machines of this character have automatic cover retaining means which catch when the cover is open and my switch is designed to take the place of this ordinary structure. My switch comprises, in addition to the arm 10, a pair of metallic strips 14 secured upon the top plate C at the sides of the slot 11 and arranged in spaced relation throughout. These strips are preferably mounted upon insulated material 15 though this might be omitted as the top plate C is commonly made of wood, which is, itself, a non-conductor of electricity. These strips are secured in position at one end by suitable screws 16 and at their other ends by suitable pins or the like 17. Adjacent the rear end of the slot 11, the strips have formed thereon inwardly extending lugs 18, which are slightly spaced apart and which are so arranged as to be bridged by the heel 12 when the cover B is in open position. At some suitable point upon the top plate C is disposed a base 19 within which is engaged an incandescent bulb 20 and one terminal of this base is connected with one of the screws 16. The other screw 16 and the other terminal of the base are connected with a double contact socket 21 extending through the back of the cabinet A at some convenient point. This socket is adapted to have engaged therein a double contact plug connected with suitable lead wires leading either to batteries or to the current supply of a house.

In the operation of the device it will be seen that when the cover B is closed and the arm 10 is disposed within a slot 11, the lamp will be deënergized. When the cover B is swung to open position and the heel 12 of the arm 10 engaged upon the lugs 18 the lugs will be bridged and current will flow through the metallic strips 14 and through the bulb, energizing the lamp and illuminating the top of the cabinet so that the operator may readily inspect a record disposed upon the turn-table of the talking machine and so that the operator may properly dispose the stylus upon the record.

Referring to Figs. 5 and 6, it will be seen that I have provided a slightly modified form of switch. In this form instead of employing spaced metallic strips as in the previous form, I make use of a metallic plate 22 which is provided with a slot 23, registering with the slot 11 in the top plate C. This plate 22 is secured at one end by a screw 24 and has its other end provided with a cut out portion 25 within which is disposed a plug 26 of insulating material having a hole 27 through which extends a spring contact 28 held by a screw 29 passing into the top plate C. The operation of this form of the device is the same as that of the preceding form except that when the cover is open one portion of the arm 10 will contact with the plate 22 and the heel 12 will engage the spring contact 28 for completing the circuit through the lamp.

From the foregoing description and a study of the drawings it will be apparent that I have thus provided a simple and inexpensive switch formed as a part of the means for retaining the cover in open position, this switch having associated therewith an incandescent bulb which will be energized automatically whenever the cover is open so as to illuminate the interior of the top portion of a talking machine.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a cabinet having a hinged cover and a top, said top being provided with a slot, an arm pivotally connected with said cover and slidable through said slot, said arm being cut away at its free end to provide a heel, a pair of metallic members disposed in horizontal position upon said top adjacent said slot and spaced apart, and an incandescent bulb arranged in circuit with a source of current and said metallic members, engagement of said heel with said metallic members upon opening of said cover bridging said metallic members for closing the circuit, the free end portion of the arm remaining within said slot when said heel is in engagement with the contacts whereby to prevent lateral displacement of the arm.

2. In a talking machine cabinet including a hinged cover, a stationary top, and an arm pivotally connected with the cover and movable through a guide slot in the stationary top of the cabinet; illuminating means comprising an incandescent bulb, a metal plate secured upon said stationary top and having a slot registering with the slot therein, said plate having at one end a cut-out portion, and a spring contact secured within said cut-out portion and insulated from the plate, said plate and contact being in circuit with said bulb and a source of current, and the free end of said arm being cut away to form a toe and a heel engageable with said contact.

In testimony whereof I affix my signature.

FERDINAND A. BARRETT, Jr.